United States Patent
Ewing et al.

(10) Patent No.: US 7,774,443 B2
(45) Date of Patent: Aug. 10, 2010

(54) POWER-MANAGER CONFIGURATION UPLOAD AND DOWNLOAD METHOD AND SYSTEM FOR NETWORK MANAGERS

(75) Inventors: Carrel W. Ewing, Incline Village, NV (US); Brian P. Auclair, Reno, NV (US); Mark J. Bigler, Eugene, OR (US); Andrew J. Cleveland, Reno, NV (US); James P. Maskaly, Sparks, NV (US); Jay Henley Williams, Yankton, SD (US)

(73) Assignee: Server Technology, Inc., Reno, NV (US)

( * ) Notice: Subject to any disclaimer, the term of this patent is extended or adjusted under 35 U.S.C. 154(b) by 870 days.

(21) Appl. No.: 09/892,350

(22) Filed: Jun. 26, 2001

(65) Prior Publication Data

US 2002/0002582 A1    Jan. 3, 2002

Related U.S. Application Data

(63) Continuation-in-part of application No. 09/732,557, filed on Dec. 8, 2000, now Pat. No. 7,099,934, which is a continuation-in-part of application No. 09/375,471, filed on Aug. 16, 1999, now Pat. No. 6,711,613, which is a continuation-in-part of application No. 08/685,436, filed on Jul. 23, 1996, now Pat. No. 5,949,974.

(51) Int. Cl.
   *G06F 15/173* (2006.01)
(52) U.S. Cl. .................. 709/223; 713/300; 713/310; 713/330; 713/340; 340/693.1; 361/601; 361/622
(58) Field of Classification Search .............. 709/200, 709/201, 217, 223, 220, 253; 710/15
   See application file for complete search history.

(56) References Cited

U.S. PATENT DOCUMENTS

| | | |
|---|---|---|
| 4,644,320 A | 2/1987 | Carr et al. |
| 4,918,562 A | 4/1990 | Pulizzi et al. |
| 5,424,903 A | 6/1995 | Schreiber |
| 5,506,790 A | 4/1996 | Nguyen |

(Continued)

OTHER PUBLICATIONS

Server Technology, Inc., "VersaTimer Operations Manual, Thank you for purchasing the VersaTimer," 3 pages, marked © 1995.

(Continued)

*Primary Examiner*—John Follansbee
*Assistant Examiner*—Dohm Chankong
(74) *Attorney, Agent, or Firm*—Holland & Hart LLP

(57) ABSTRACT

A power management system embodiment of the present invention comprises a power manager with a network agent in communication over a network with a network manager. The power manager is connected to control the operating power flowing to various pieces of computer network equipment at a single site. A user is able to assign names to each control port, and the power manager maintains a list of enrolled users who have access. Many operational mode choices are possible, and each can be configured by the user while remote from the power manager. The power manager can be commanded to upload a user configuration list, and it can be commanded to accept a downloaded user configuration list.

8 Claims, 5 Drawing Sheets

U.S. PATENT DOCUMENTS

| | | | |
|---|---|---|---|
| 5,537,462 | A | 7/1996 | Utter et al. |
| 5,642,002 | A | 6/1997 | Mekanik et al. |
| 5,650,771 | A | 7/1997 | Lee |
| 5,717,934 | A * | 2/1998 | Pitt et al. ............... 713/330 |
| 5,721,934 | A | 2/1998 | Scheurich |
| 5,732,281 | A * | 3/1998 | Summers et al. ............ 710/8 |
| 5,736,847 | A | 4/1998 | Van Doorn et al. |
| 5,768,148 | A * | 6/1998 | Murphy et al. ............ 700/286 |
| 5,862,391 | A * | 1/1999 | Salas et al. ............... 713/300 |
| 5,923,103 | A | 7/1999 | Pulizzi et al. |
| 5,991,885 | A * | 11/1999 | Chang et al. ............. 713/300 |
| 5,995,911 | A | 11/1999 | Hart |
| 6,008,805 | A | 12/1999 | Land et al. |
| 6,029,092 | A * | 2/2000 | Stein ........................ 700/11 |
| 6,031,354 | A * | 2/2000 | Wiley et al. ............... 320/116 |
| 6,035,264 | A * | 3/2000 | Donaldson et al. ......... 702/182 |
| 6,160,873 | A | 12/2000 | Truong et al. |
| 6,266,713 | B1 * | 7/2001 | Karanam et al. ............ 710/9 |
| 6,381,700 | B1 | 4/2002 | Yoshida |
| 6,408,334 | B1 | 6/2002 | Bassman et al. |
| 6,408,395 | B1 * | 6/2002 | Sugahara et al. ............ 713/310 |
| 6,459,175 | B1 * | 10/2002 | Potega ...................... 307/149 |
| 6,476,729 | B1 | 11/2002 | Liu |
| 6,496,103 | B1 * | 12/2002 | Weiss et al. ............. 340/310.01 |
| 6,507,273 | B1 | 1/2003 | Change et al. |
| 6,519,509 | B1 * | 2/2003 | Nierlich et al. ............ 700/286 |
| 6,608,406 | B2 * | 8/2003 | Bersiek .................... 307/125 |
| 6,628,009 | B1 | 9/2003 | Chapel |
| 6,643,566 | B1 * | 11/2003 | Lehr et al. ................. 700/286 |
| 6,684,343 | B1 | 1/2004 | Bouchier et al. |
| 6,715,088 | B1 * | 3/2004 | Togawa ..................... 713/320 |
| 6,762,675 | B1 * | 7/2004 | Cafiero et al. ............ 340/10.42 |
| 7,119,676 | B1 | 10/2006 | Silverstrim et al. |
| 7,349,956 | B2 | 3/2008 | Anderson et al. |
| 2002/0004913 | A1 | 1/2002 | Fung |
| 2002/0104031 | A1 * | 8/2002 | Tomlinson et al. .......... 713/320 |
| 2002/0120676 | A1 | 8/2002 | Biondi et al. |
| 2006/0186739 | A1 | 8/2006 | Grolnic et al. |

OTHER PUBLICATIONS

Server Technology, Inc., "VersaTimer, A 7-Day, Programmable Power Scheduler," 2 pages, marked © 1994.

Western Telematic, Inc., "RMM Rack Mount Data/Fax Modem, WIT Part No. 12548 Rev. F, User's Guide," 15 pages, marked © 1998 and Sep. 1998.

Mirapath, A Cyclades Premier Partner, "AlterPath PM User Guide." 49 pages, marked © 2003 and Jun. 2003.

Western Telematic, Inc., "NPS Series Network Power Switch Models NPS-115 and NPS-230, WTI Part No. 12927 Rev. C, User's Guide," 19 pages, marked © 1999 and Jul. 1999.

Systems Enhancement Corporation, "Power Administrator 800 User Manual," Oct. 1, 1996, Systems Enhancement Corporation, Chesterfield, MO, USA.

American Power Conversion Corporation, "MasterSwitch VM Power Distribution Unit User Guide," Dec. 1999, American Power Conversion Corporation, W. Kingston, RI, USA.

American Power Conversion Corporation, "MasterSwitch VM Power Distribution Unit Installation and Quick Start Manual," Dec. 1999, American Power Conversion Corporation, W. Kingston, RI, USA.

American Power Conversion Corporation, "PowerNet SNMP Management Information Base v3.1.0 Reference Guide," Nov. 1999, American Power Conversion Corporation, W. Kingston, RI, USA.

"Server Technology, Inc.'s Fifth Amended Disclosure of Asserted Claims and Preliminary Infringement Contentions With Exhibits," *Server Technology, Inc.* v. *American Power Conversion Corporation*, Case No. 3:06-CV-00698-LRH-VPC, 30 pp. (Sep. 29, 2007).

"American Power Conversion Corporation's Preliminary Invalidity Contentions," *Server Technology, Inc.* v. *American Power Conversion Corporation*, Case No. 3:06-CV-00698-LRH-VPC, 89 pp. (Oct. 12, 2007).

"American Power Conversion Corporation's Preliminary Claim Constructions and Extrinsic Evidence (Patent Local Rule 4-2)," *Server Technology, Inc.* v. *American Power Conversion Corporation*, Case No. 3:06-CV-00698-LRH-VPC, 8 pp. (Jan. 21, 2008).

Plaintiff and Counterdefendant Server Technology, Inc.'s Preliminary Claim Constructions and Extrinsic Evidence (Patent Local Rule 4-2), *Server Technology, Inc.* v. *American Power Conversion Corporation*, Case No. 3:06-CV-00698-LRH-VPC, 7 pp. (Jan. 29, 2008).

"Complaint for Patent Infringement," *Server Technology, Inc.* v. *American Power Conversion Corporation*, Case No. 3:06-CV-__, 61 pp. (Dec. 18, 2006).

"First Amended Complaint for Patent Infringement," *Server Technology, Inc.* v. *American Power Conversion Corporation*, Case No. 3:06-CV-00698-LRH-VPC, 83 pp. (Feb. 20, 2007).

"Defendant's Answer and Affirmative Defenses to Plaintiffs Complaint for Patent Infringement; Counterclaims for Declaratory Judgment of Patent Noninfringement and Patent Invalidity; and Patent Infringement; Demand for Jury Trial," *Server Technology, Inc.* v. *American Power Conversion Corporation*, Case No. 3:06-CV-00698-LRH-VPC, 37 pp. (Apr. 2, 2007).

"Plaintiff Server Technology Inc.'s Reply to Defendant's First Amended Counterclaims for Declaratory Judgment of Patent Noninfringement and Patent Invalidity; and Patent Infringement; Jury Demand," *Server Technology, Inc.* v. *American Power Conversion Corporation*, Case No. 3:06-CV-00698-LRH-VPC, 8 pp. (Apr. 30, 2007).

"Joint Claim Construction Chart and Prehearing Statement (Patent Rule 4.3)," *Server Technology, Inc.* v. *American Power Conversion Corporation*, Case No. 3:06-CV-00698-LRH-VPC, 77 pp. (Feb. 22, 2008).

"Plaintiff and Counterdefendant Server Technology, Inc.'s Opening Claim Construction Brief," *Server Technology, Inc.* v. *American Power Conversion Corporation*, Case No. 3:06-CV-00698-LRH-VPC, 206 pp. (May 19, 2008).

"American Power Conversion Corp.'s Response to Plaintiff and Counterdefendant Server Technology, Inc.'s Opening Claim Construction Brief," *Server Technology, Inc.* v. *American Power Conversion Corporation*, Case No. 3:06-CV-00698-LRH-VPC, 279 pp. (Jul. 25, 2008).

"Plaintiff and Counterdefendant Server Technology, Inc.'s Reply to APC's Response to STI's Opening Claim Construction Brief," *Server Technology, Inc.* v. *American Power Conversion Corporation*, Case No. 3:06-CV-00698-LRH-VPC, 287 pp. (Aug. 8, 2008).

"Server Technology's Proposed Order on Claim Construction," *Server Technology, Inc.* v. *American Power Conversion Corporation*, Case No. 3:06-CV-00698-LRH-VPC, 22 pp. (Dec. 5, 2008).

"American Power Conversion Corp.'s Proposed Order on Claim Construction," *Server Technology, Inc.* v. *American Power Conversion Corporation*, Case No. 3:06-CV-00698-LRH-VPC, 24 pp. (Dec. 5, 2008).

"Continuation of Server Technology's Reply to American Power Conversion Corp.'s Response to Opening Claim Construction Brief," *Server Technology, Inc.* v. *American Power Conversion Corporation*, Case No. 3:06-CV-00698-LRH-VPC, 94 pp. (Aug. 11, 2008).

"American Power Conversion Corporation's Response to Server Technology's Proposed Order on Claim Construction," *Server Technology, Inc.* v. *American Power Conversion Corporation*, Case No. 3:06-CV-00698-LRH-VPC, 24 pp. (Jan. 5, 2009).

"Server Technology's Corrected Response in Opposition to APC's Proposed Order on Claim Construction," *Server Technology, Inc.* v. *American Power Conversion Corporation*, Case No. 3:06-CV-00698-LRH-VPC, 23 pp. (Jan. 8, 2009).

"American Power Conversion Corporation's Reply Regarding Server Tech.'s Proposed Order on Claim Construction," *Server Technology, Inc.* v. *American Power Conversion Corporation*, Case No. 3:06-CV-00698-LRH-VPC, 13 pp. (Jan. 12, 2009).

"Server Technology's Reply to APC's Response to Server Technology's Proposed Order on Claim Construction," *Server Technology,*

*Inc.* v. *American Power Conversion Corporation*, Case No. 3:06-CV-00698-LRH-VPC, 13 pp. (Jan. 12, 2009).

"American Power Conversion Corporation's Motion for Leave to File a Surreply to Server Tech.'s Reply Brief on Claim Construction," *Server Technology, Inc.* v. *American Power Conversion Corporation*, Case No. 3:06-CV-00698-LRH-VPC, 3 pp. (Jan. 22, 2009).

"Server Technology's Response in Opposition to APC's Motion to File a Surreply to Server Technology's Reply Brief on Claim Construction," *Server Technology, Inc.* v. *American Power Conversion Corporation*, Case No. 3:06-CV-00698-LRH-VPC, 9 pp. (Feb. 7, 2009).

"Server Technology's Response in Opposition to APC's Proposed Order on Claim Construction," *Server Technology, Inc.* v. *American Power Conversion Corporation*, Case No. 3:06-CV-00698-LRH-VPC, 23 pp. (Jan. 6, 2009).

"American Power Conversion Corporation's Surreply to Server Tech.'s Reply Brief on Claim Construction," *Server Technology, Inc.* v. *American Power Conversion Corporation*, Case No. 3:06-CV-00698-LRH-VPC, 5 pp. (Jan. 22, 2009).

\* cited by examiner

POWER-MANAGER CONFIGURATION UPLOAD AND DOWNLOAD METHOD AND SYSTEM FOR NETWORK MANAGERS

CO-PENDING APPLICATIONS

This Application is a continuation-in-part of U.S. patent application Ser. No. 09/732,557, filed Dec. 8, 2000, titled NETWORK-CONNECTED POWER MANAGER FOR REBOOTING REMOTE COMPUTER-BASED APPLIANCES, that is a continuation-in-part of U.S. patent application Ser. No. 09/375,471, filed Aug. 16, 1999, titled REMOTE POWER CONTROL SYSTEM THAT VERIFIES WHICH DEVICES IS SHUT-DOWN BEFORE SUCH ACTION IS COMMITTED TO, which in turn is a continuation-in-part of U.S. patent application Ser. No. 08/685,436, that was filed on Jul. 23, 1996 and is titled, SYSTEM FOR READING THE STATUS AND CONTROLLING THE POWER SUPPLIES OF APPLIANCES CONNECTED TO COMPUTER NETWORKS, and now U.S. Pat. No. 5,949,974, issued Sep. 7, 1999.

BACKGROUND OF THE INVENTION

1. Field of the Invention

The invention relates generally to remote power management systems, and more particularly to uploading and downloading user configuration information in bulk to avoid time-consuming and tedious power-manager configuration dialogs and scripts.

2. Description of the Prior Art

Remotely located power managers at network equipment centers typically need to be configured by either the installer or network administrator. When only a few power controllers and options are being handled, such configuration management is next to trivial. But large network server farms, hotels, and other concentrated-equipment sites are being put in all around the world. The numbers of controlled equipment, and the numbers of sites can be overwhelming. Manually peeking and poking at the configuration from a network administrator's control panel is not very feasible for these major installations.

SUMMARY OF THE PRESENT INVENTION

Briefly, a power management system embodiment of the present invention comprises a power manager with a network agent in communication over a network with a network manager. The power manager is connected to control the operating power flowing to various pieces of computer network equipment at a single site. A user is able to assign names to each control port, and the power manager maintains a list of enrolled users who have access. Many operational mode choices are possible, and each can be configured by the user while remote from the power manager. The power manager can be commanded to upload a user configuration list, and it can be commanded to accept a downloaded user configuration list.

An advantage of the present invention is that a system and method are provided that can speed the configuration of a power manager.

Another advantage of the present invention is that a system and method are provided for duplicating, modifying, and replicating user configurations for power managers.

A further advantage of the present invention is that a system and method are provided that allows a network console operator to control the electrical power status of a router or other network device.

A still further advantage of the present invention is that a system and method are provided for reducing the need for enterprise network operators to dispatch third party maintenance vendors to remote equipment rooms and POP locations simply to power-cycle failed network appliances.

Another advantage of the present invention is that a system and method are provided for reducing the time it takes to restore a failed network appliance and improving service levels.

Another advantage of the present invention is that a system and method are provided for reducing organization losses from network downtime.

These and many other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
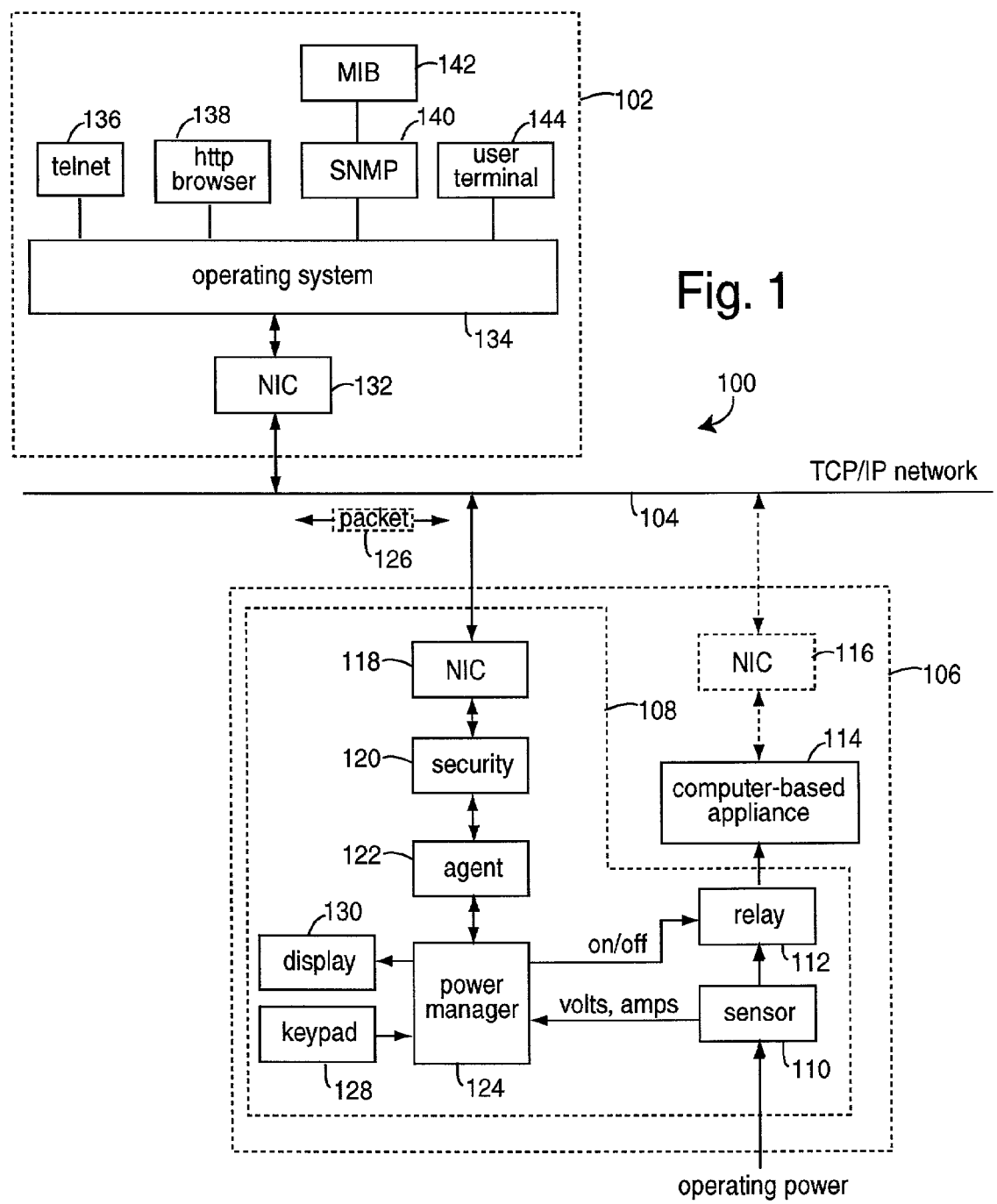
FIG. 1 is a functional block diagram of a power manager system embodiment of the present invention that is able to pass user configuration data over a computer data network like the Internet.

FIG. 1 represents a power manager system embodiment of the present invention, and is referred to herein by the general reference numeral 100. A network management system (NMS) 102 is connected by a network 104 to a remote site 106. A power controller 108 forwards operating power through a sensor 110 and relay-switch 112 to a computer-based appliance 114. Such operating power can be the traditional 110 VAC or 220 VAC power familiar to consumers, or direct current (DC) battery power familiar to telephone central-office "plant" employees. A network interface controller (NIC) 116 may be used to connect the computer-based appliance 114 to the network 104. Such would be especially true if the computer-based appliance 114 were a server, router, bridge, etc.

The power controller 108 can be configured to operate in a number of different modes, and such options are selected and stored in a configuration memory. The NMS 102 may download configurations to power controller 108, and may upload them for editing, archiving, and/or duplication to other power controllers 108 at other remote sites 106. Embodiments of the present invention are directed towards systems and methods that do such uploading, downloading, editing, archiving, and duplication of power manager configuration files.

The power manager system 100 maintains the operating health of the computer-based appliance 114. Such computer-based appliance 114 is prone to freezing or crashing where it is effectively dead and unresponsive. It is also some mission-critical assignment that suffers during such down time. It is therefore the role and purpose of the power manager 100 to monitor the power and environmental operating conditions in which the computer-based appliance 114 operates, and to afford management personnel the ability to turn the computer-based appliance 114 on and off. Such allows a power-on rebooting of software in the computer-based appliance 114 to be forced remotely from the NMS 102. The operating conditions and environment are preferably reported to the NMS 102 on request and when alarms occur.

The power controller 108 further includes a network interface controller (NIC) 118, and this may be connected to a security device 120. If the network 104 is the Internet, or otherwise insecure, it is important to provide protection of a network agent 122 from accidental and/or malicious attacks that could disrupt the operation or control of the computer-based appliance 114. At a minimum, the security device 120 can be a user password mechanism. Better than that, it could include a discrete network firewall and data encryption.

The network agent 122 interfaces to a remote power manager 124, and it converts software commands communicated in the form of TCP/IP datapackets 126 into signals the remote power manager can use. For example, messages can be sent from the NMS 102 that will cause the remote power manager 124 to operate the relay-switch 112. In reverse, voltage, current, and temperature readings collected by the sensor 110 are collected by the remote power manager 124 and encoded by the network agent 122 into appropriate datapackets 126. Locally, a keyboard 128 can be used to select a variety of readouts on a display 130, and also to control the relay-switch 112.

The display 130 and keyboard 128 can be connected as a terminal through a serial connection to the power manager 124. Such serial connection can have a set of intervening modems that allow the terminal to be remotely located. The display 130 and keyboard 128 can also be virtual, in the sense that they are both emulated by a Telnet connection over the network 104.

The NMS 102 typically comprises a network interface controller (NIC) 132 connected to a computer platform and its operating system 134. Such operating system can include Microsoft WINDOWS-NT, or any other similar commercial product. Such preferably supports or includes a Telnet application 136, a network browser 138, and/or an SNMP application 140 with an appropriate MIB 142. A terminal emulation program or user terminal 144 is provided so a user can manage the system 100 from a single console.

If the computer-based appliance 114 is a conventional piece of network equipment, e.g., as supplied by Cisco Systems (San Jose, Calif.), there will usually be a great deal of pre-existing SNMP management software already installed, e.g., in NMS 102 and especially in the form of SNMP 140. In such case it is usually preferable to communicate with the network agent 122 using SNMP protocols and procedures. Alternatively, the Telnet application 136 can be used to control the remote site 106.

An ordinary browser application 138 can be implemented with MSN Explorer, Microsoft Internet Explorer, or Netscape NAVIGATOR or COMMUNICATOR. The network agent 122 preferably includes the ability to send http-messages to the NMS 102 in datapackets 126. In essence, the network agent 122 would include an embedded website that exists at the IP-address of the remote site 106. An exemplary embodiment of a similar technology is represented by the MASTER-SWITCH-PLUS marketed by American Power Conversion (West Kingston, R.I.).

Many commercial network devices provide a contact or logic-level input port that can be usurped for the "tickle" signal. Cisco Systems routers, for example, provide an input that can be supported in software to issue the necessary message and identifier to the system administrator. A device interrupt has been described here because it demands immediate system attention, but a polled input port could also be used.

Network information is generally exchanged with protocol data unit (PDU) messages, which are objects that contain variables and have both titles and values. SNMP uses five types of PDUs to monitor a network. Two deal with reading terminal data, two deal with setting terminal data, and one, the trap, is used for monitoring network events such as terminal start-ups or shut-downs. When a user wants to see if a terminal is attached to the network, for example, SNMP is used to send out a read PDU to that terminal. If the terminal is attached, a user receives back a PDU with a value "yes, the terminal is attached". If the terminal was shut off, a user would receive a packet informing them of the shutdown with a trap PDU.

In alternative embodiments of the present invention, it may be advantageous to include the power manager and intelligent power module functions internally as intrinsic components of an uninterruptable power supply (UPS). In applications where it is too late to incorporate such functionally, external plug-in assemblies are preferred such that off-the-shelf UPS systems can be used.

Once a user has installed and configured the power manager 108, a serial communications connection is established. For example, with a terminal or terminal emulation program. Commercial embodiments of the present invention that have been constructed use a variety of communications access methods.

For modem access, the communication software is launched that supports ANSI or VT100 terminal emulation to dial the phone number of the external modem attached to the power manager. When the modems connect, a user should see a "CONNECT" message. A user then presses the enter key to send a carriage return.

For direct RS-232C access, a user preferably starts any serial communication software that supports ANSI or VT100 terminal emulation. The program configures a serial port to one of the supported data rates (38400, 19200, 9600, 4800, 2400, 1200, and 300 BPS), along with no parity, eight data bits, and one stop bit, and must assert its Device Ready signal (DTR or DSR). A user then presses the enter key to send a carriage return.

For Ethernet network connections, the user typically connects to a power manager 108 by using a TELNET program or TCP/IP interface. The power manager will automatically detect the data rate of the carriage return and send a username login prompt back to a user, starting a session. After the carriage return, a user will receive a banner that consists of the word "power manager" followed by the current power manager version string and a blank line and then a "Username:" prompt.

A user logged in with the administrative username can control power and make configuration changes. A user logged in with a general username can control power. Also, while a user logged in with the administrative username can control power to all intelligent power modules, a user logged in with a general username may be restricted to controlling power to a specific intelligent power module or set of intelligent power modules, as configured by the administrator.

A parent case, U.S. patent application Ser. No. 09/732,557, filed Dec. 8, 2000, titled NETWORK-CONNECTED POWER MANAGER FOR REBOOTING REMOTE COMPUTER-BASED APPLIANCES, includes many details on the connection and command structure used for configuration management of power manager embodiments of the present invention. Such patent application is incorporated herein by reference and the reader will find many useful implementation details there. Such then need not be repeated here.

Referring again to FIG. 1, a user at the user terminal 144 is able to send a command to the power manager 124 to have the power manager configuration file uploaded. The power manager 124 concentrates the configuration data it is currently operating with into a file. The user at user terminal 144 is also able to send a command to the power manager 124 to have it accept a power manager configuration file download. The download file then follows. Once downloaded, the power manager 124 begins operating with that configuration if there were no transfer or format errors detected. These commands to upload and download configuration files are preferably implemented as an extension to an already existing repertoire of commands, and behind some preexisting password protection mechanism. HyperTerminal, and other terminal emulation programs allow users to send and receive files.

In a minimal implementation, the power manager configuration files are not directly editable because they are in a concentrated format. It would, however be possible to implement specialized disassemblers, editors, and assemblers to manipulate these files off-line.

Figure 2:
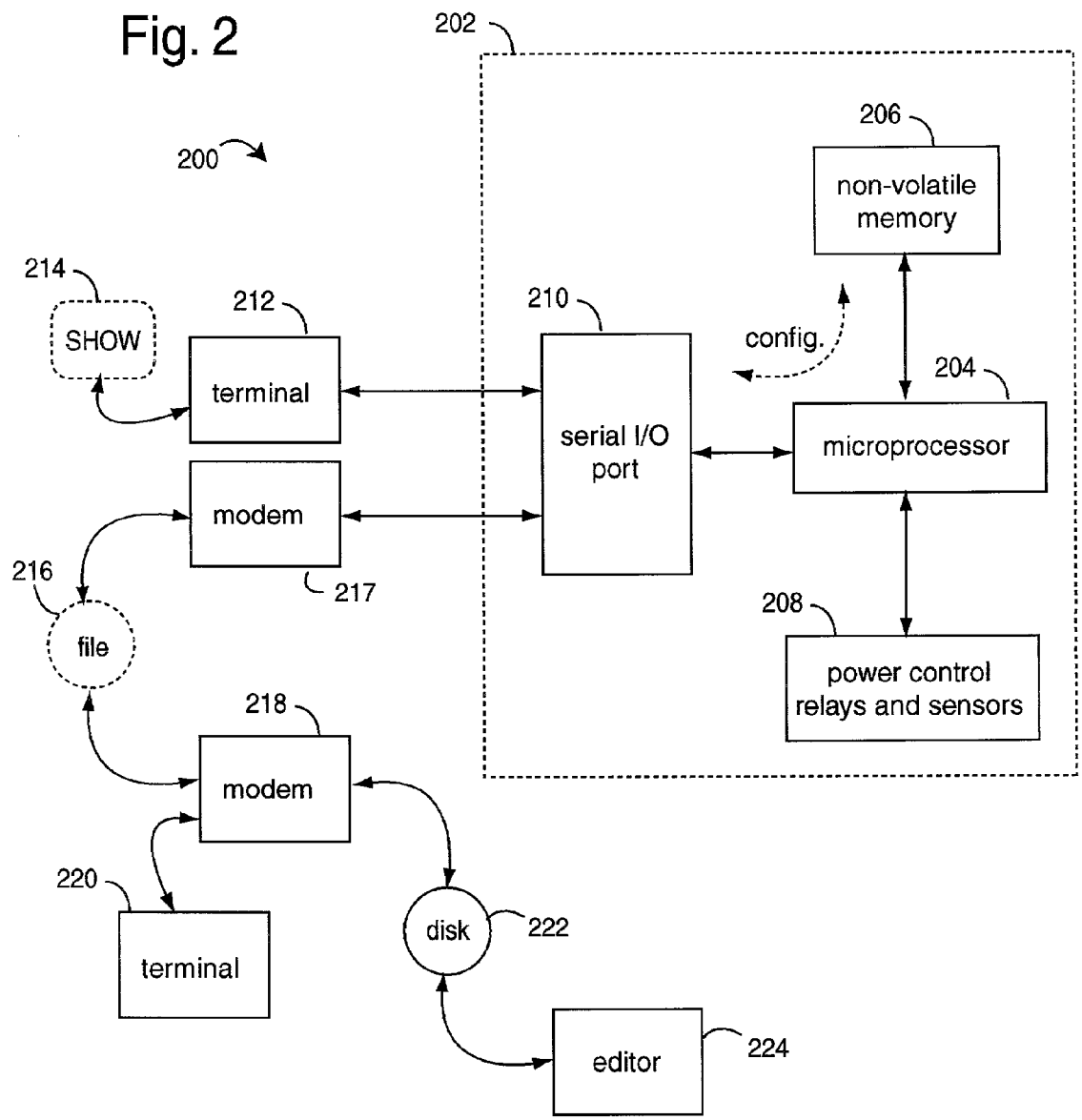
FIG. 2 is a functional block diagram of a power manager embodiment of the present invention showing the configuration and flow of user configuration files and display screens.

FIG. 2 represents a power management system 200 that includes a power controller 202. A microprocessor 204 is connected to a non-volatile memory 206 that can store user configuration data, e.g., user-assigned names for various controlled ports. A plurality of power control relays and sensors 208 respond to various control signals issued by the microprocessor 204 and are dependent on the user configuration data. A serial input/output (I/O) port 210 allows the configuration data to be inspected or modified via a data terminal 212. For example, a SHOW display screen 214 on the terminal 212 graphically displays all user configuration choices in the memory 206.

Alternatively, the user configuration can be transferred in a file 216 over a data modem pair 217-218 to a remote terminal 220. The file 216 may also be uploaded or downloaded from a disk 222. An off-line editor 224 allows the user configuration file to be created, uploaded-modified, and downloaded. For example, where many power management systems 202 are being installed or maintained, the user configuration file 216 corresponding to each can be individually customized by the editor 224. Such could save a great deal of time, effort, and expense.

Figure 3:
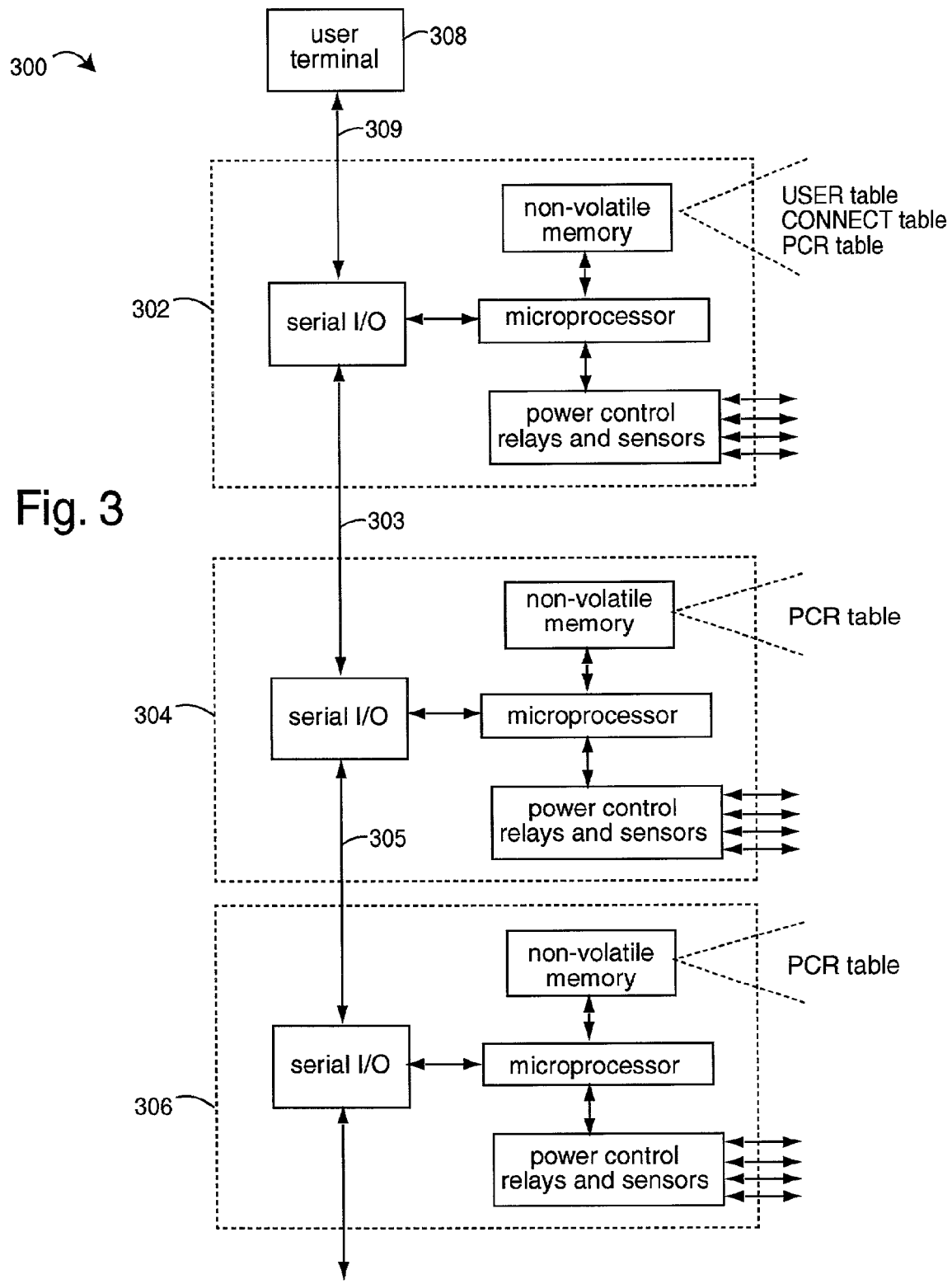
FIG. 3 is a functional block diagram of a number of power managers in a system embodiment of the present invention that have been connected in a daisy-chain serial arrangement to expand the number of power control points possible.

FIG. 3 is a diagram of an expandable power management system 300. In one commercial embodiment of the present invention, a first power controller board 302 is daisy-chain connected through a serial cable 303 to a second power controller board 304. In turn, the second power controller board 304 is connected through a serial cable 305 to a third power controller board 306. All three power controller boards can communicate with a user terminal 308 connected by a cable 309, but such communication must pass through the top power controller board 302 first.

Alternatively, the user terminal can be replaced by an IP-address interface that will provide a webpresence and interactive webpages. If then connected to the Internet, ordinary browsers can be used to upload and download user configurations.

Each power controller board is preferably identical in its hardware and software construction, and yet the one placed at the top of the serial daisy-daisy-chain is able to detect that situation and take on a unique role as gateway. Each power controller board is similar to power controller 202 (FIG. 2). Each power controller board communicates with the others to coordinate actions. Each power controller board independently stores user configuration data for each of its power control ports. A typical implementation will have four relay-operated power control ports. Part of the user configuration can include a user-assigned name for each control port.

A resynchronization program is executed in each microprocessor of each power controller board 302, 304, and 306, that detects where in the order of the daisy-chain that the particular power controller board is preferably located. The appropriate main program control loop is selected from a collection of firmware programs that are copied to every power controller board. In such way, power controller boards may be freely added, replaced, or removed, and the resulting group will resynchronize itself with whatever is present.

The top power controller board 302 uniquely handles interactive user log-in, user-name tables, its private port names, and transfer acknowledgements from the other power controller boards. All the other power controller boards concern themselves only with their private resources, e.g., port names.

During a user configuration file upload, power controller board 302 begins a complete message for all the power controller boards in the string with the user-table. Such is followed by the first outlets configuration block from power controller board 302, and the other outlet configuration blocks from power controller boards 304 and 306. The power controller board 302 tells each when to chime in. Each block carries a checksum so transmission errors can be detected. Each block begins with a header that identifies the source or destination, then the data, then the checksum.

During a user configuration file download, power controller board 302 receives a command from a user that says a configuration file is next. The user-name table and the serial-name table is received by power controller board 302 along with its private outlets configuration block and checksum. The next section is steered to power controller board 304 and it receives its outlets configuration block and checksum. If good, an acknowledgement is sent to the top power controller board 302. The power controller boards further down the string do the same until the whole download has been received. If all power controller boards returned an acknowledgement, the power controller board 302 acknowledges the whole download. Operation then commences with the configuration. Otherwise a fault is generated and the old configuration is retained.

Figure 4:
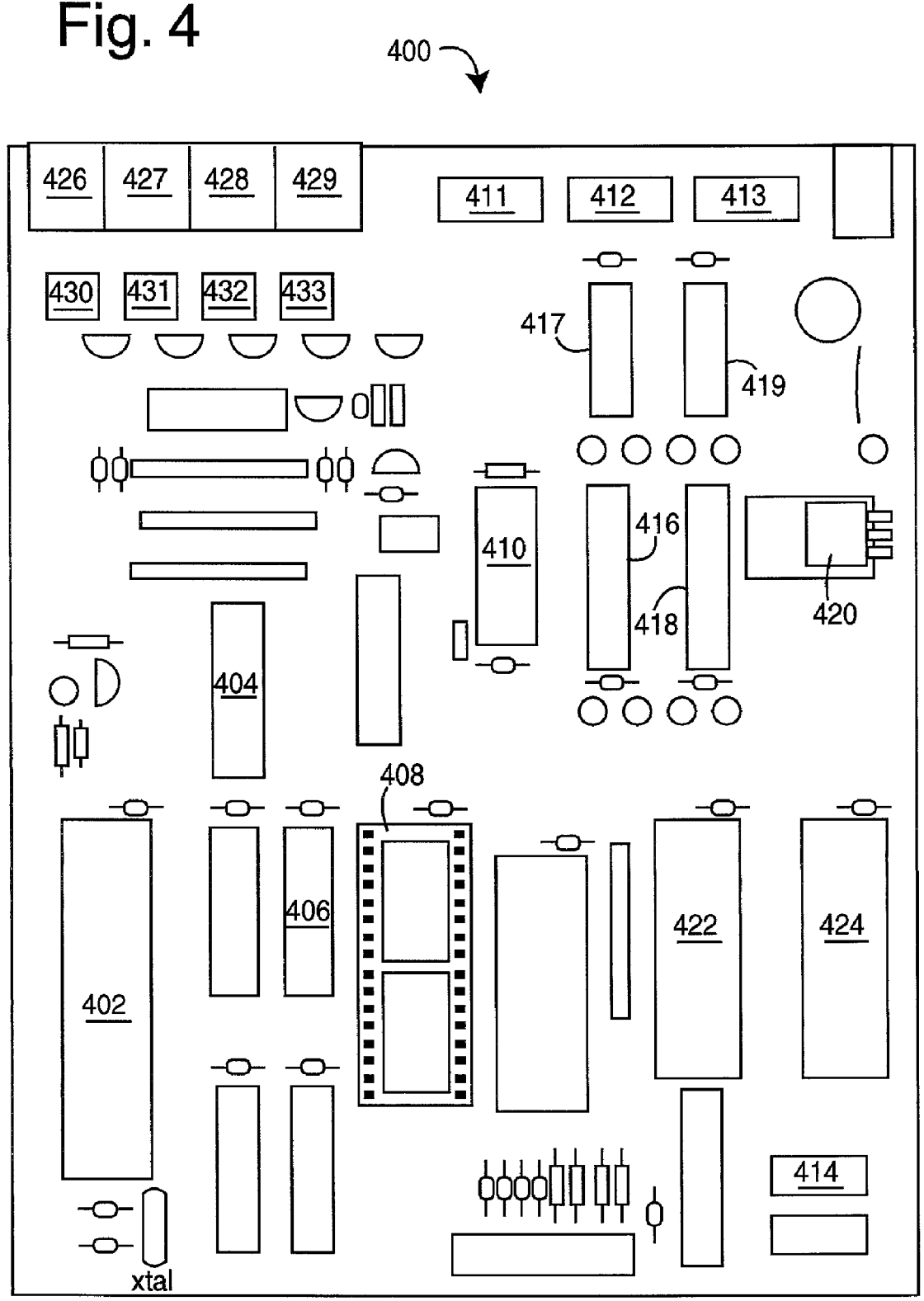
FIG. 4 is a plan view of a layout of a printed circuit board for a power manager in one embodiment of the present invention that has reduced EMI levels.

FIG. 4 is a plan view of a power controller printed circuit board (PCB) 400, in an implementation of power controller boards 302, 304, and 306. A microprocessor (CPU) 402 comprises a Dallas Semiconductor DS80C320, which is a CMOS derivative of an Intel 8051. A pair of programmable array logic (PAL) devices 404 and 406 do I/O port and memory address decoding. A socket 408 is provided for a two M-bit flash memory device that will ultimately store the user configuration data. A PIC-microcontroller 410, e.g., a Microchip Technology (Chandler, Ariz.) PIC16F84A device, talks with a temperature sensor, controls serial communication data rates, and secures the flash memory in socket 408. It further is responsible for LED blink synchronization amongst the power controller boards. Four serial I/O connectors 411-414 are RS-232 interfaced by a set of level conversion interface chips 416-419. A three-terminal regulator 420 provides operating power for the digital logic. A pair of analog matrix devices 422 and 424, e.g., CD74HC22106 types, allow the serial I/O ports to be interconnected in a variety of arrangements. A set of four RJ-11 type connectors 426-429 respectively connect to four power-control relay boards (see FIG. 5) that actually switch high-current utility circuits to network appliances. A set of two-wire connectors 430-433 can be used to forewarn each network appliance that its utility power is about to be interrupted, e.g., so a graceful shutdown can be executed.

Such PIC-microcontroller 410 preferably includes a code protection bit that can be permanently set to make its internal program code unreadable. Such then allows the PIC-microcontroller 410 to act as a tamper-protection device for the whole PCB 400, and especially for the program code and data executing and passing through CPU 402 from the flash memory.

Electromagnetic interference (EMI) is now a major concern among governments and equipment manufacturers/users. So the PCB 400 has been implemented as a four-layer board with its signal layers on the outside and the power-planes on the inside. Such construction has been found to reduce EMI to acceptable levels.

DB-9-connectors had been used on previous products, but it was learned that IDC-10 type connectors were more reliable and did not express the micro-shorting behavior of the conventional connectors. These IDC-10 connectors allow mass termination with ribbon conductor cable types, and so are easier to manufacture.

Figure 5A:
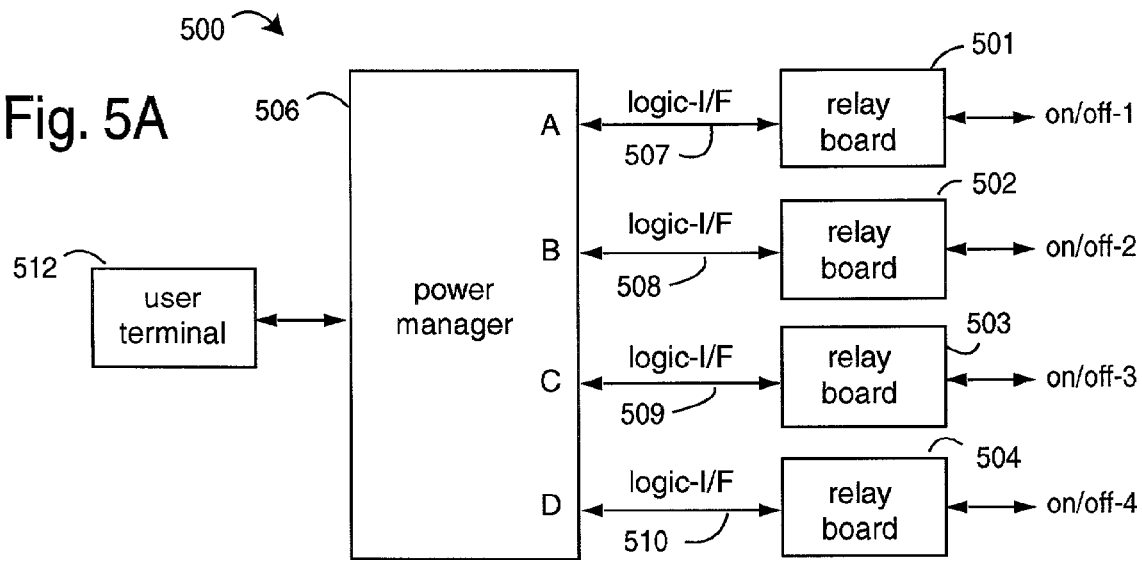
FIGS. 5A and 5B are functional block diagrams of how a power manager with only four logic-level power-control points and modular output connectors can be expanded to serially control sixteen power-control points.

FIG. 5A represents a basic power control system 500 that includes four single-point relay boards 501-504 that are able to independently control the operating power flowing to various pieces of network equipment and other appliances. Each relay board 501-504 is separately connected to a power manager 506, e.g., with a three-wire cable 507-510 and RJ-11 type plugs and jacks. A user can control the system 500 from a user terminal 512.

Figure 5B:
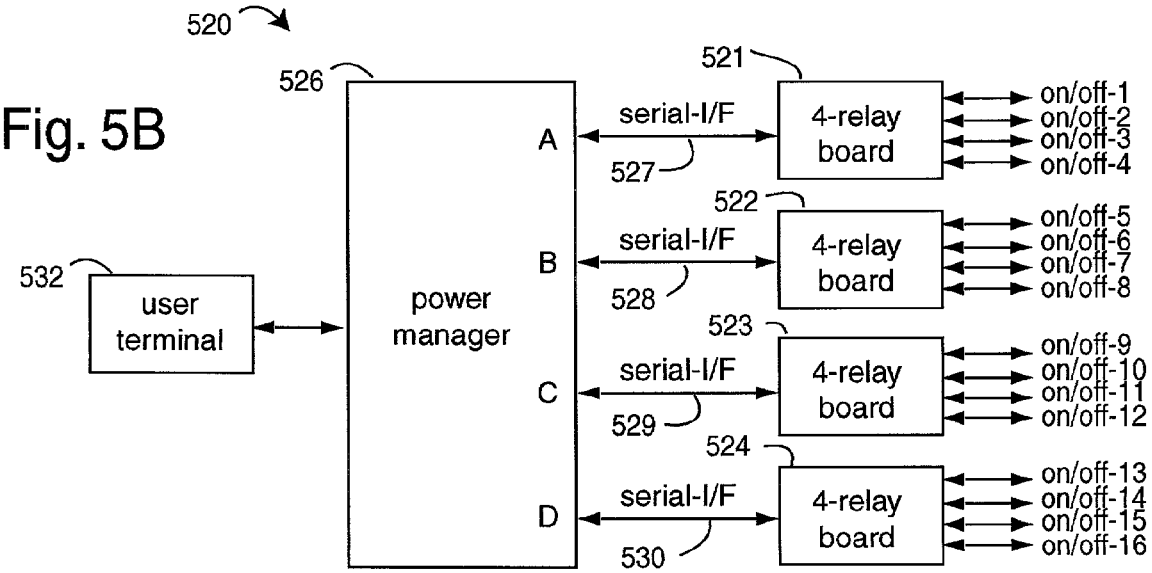

FIG. 5B represents an expanded power control system 520 that includes four four-point relay boards 521-524. This array is able to independently control the operating power flowing to sixteen pieces of network equipment and other appliances. Each relay board 521-524 is separately connected via a serial RS-232 communications link to a power manager 526, e.g., with a three-wire cable 527-530 and RJ-11 type plugs and jacks. A user can control the system 520 from a user terminal 532. Preferably, the power managers 506 and 526 differ only in their programming, and not in their constituent hardware. Logic level relay boards require only two-wires (control signal and common), but serial relay boards require three wires (data send, data receive, and common). Even logic level boards use three wires, with the third wire being used for the relay board to report power output status (on or off) back to the power controller circuit board.

Each relay board 521-524 includes a PIC-microcontroller, e.g., a Microchip Technology (Chandler, Ariz.) PIC16F84A device, that controls the serial communication interface with the power manager 526. Serial data is interpreted by the microcontroller and is used to independently operate each of the relay board's several onboard relays. Such serial communication and therefore the microcontroller isn't necessary for the relay boards 501-504 (FIG. 5A).

In a preferred application, the expanded power control system 520 is used instead of daisy-chain connecting power managers to get more control points. For example, power controller boards 304 and 306 (FIG. 3) could be eliminated and still as many as sixteen control points can be accommodated. The configuration in FIG. 3 would otherwise accommodate twelve control points as shown.

In general, power controller embodiments of the present invention will have a number of configuration parameters that are set by users. These include descriptions of the type of power controller hardware present, e.g., the type, number and capabilities of the various intelligent power modules (IPM's) and sensors. The power controller configuration attaches names to power control relays (PCR's), and other components. The configuration can be used to switch serial connections, and control usernames, passwords and access to control of power controller PCR's based on the login username.

The power controller configuration data is preferably located in a single 256-byte memory on each board. Even in a daisy-chain of power controller boards, each memory is used to store information about the board it is on. The memory at least contains all configuration information specific to the particular power controller board. A first board in a power controller board daisy-chain further includes a list of defined users and the passwords associated with the users, and a list of alias names associated with serial connections that can be accessed via a power-controller CONNECT command.

The first board in a power controller board daisy-chain uniquely maintains a username and password table for user login validation. User access to particular PCR's is based on an access bit map for each PCR associated with the power controller board. When the first board in a daisy-chain has verified a username, a user identification number associated with the username is activated and is used by all boards to allow access to various power controller resources. Saving and restoring power controller configuration information involves the 256-byte memory on each board in the daisy-chain. The username and serial name tables for all boards in a daisy-chain are kept only on the first board in the power controller board.

A command retrieves configuration data from the power controller, and another sends the data to the power controller. Initially, the configuration data is passed between users and the power controller via an ASCII file upload and download. Such upload and download is performed via a standard terminal emulation program such as the Windows HYPER-TERM program. Once the code is completed on the power controller to allow this simple mechanism to save and restore power controller configuration, the next phase of this development effort is to create a Windows based program that will automate the configuration upload and download. In addition to automating the upload/download procedure for Windows users, this program further provides a graphical user interface program to allow Windows users the ability to view and manipulate a power controller configuration file.

A power controller configuration save/restore command includes various parameters. Depending on the action requested by the user (via the command parameters) the command interacts with the user to either set up an ASCII file upload or download. The ASCII data that is sent or received contains the power controller configuration information.

An SCFG command is used initiate a configuration upload or download, depending on a parameter supplied, e.g., SCFG SAVE|RESTORE. The SCFG command is used to copy the power controller configuration information from the power controller when the SAVE parameter is specified, and to copy the power controller configuration information to the power controller when the RESTORE parameter is specified. If the command is simply used with no parameters, an error message is displayed that lists the allowable parameters. If the SAVE parameter is specified, the user is prompted to press "Q" for quit, "C" for continue, or "D" for delay. The continue option will cause the power controller to start sending configuration data immediately. The delay option inserts a sixty second delay before sending the configuration data.

When the power controller has sent all of its configuration data, a message is displayed, "Configuration Send Complete—stop receiving ASCII data". The usual power-controller prompt is displayed signaling the upload is complete.

If the RESTORE parameter was specified, a message, "Ready to receive ASCII configuration data—begin sending ASCII configuration data" is displayed. The power controller begins parsing any received data for configuration information. The configuration data download is aborted if no data is received for sixty seconds, or if a Ctrl-C is received. If the data received does not conform to the expected configuration data format, the download is rejected. An appropriate message is displayed.

The power controller preferably waits to display any message until after the last character is received. Such delay helps ensure a configuration data stream does not obscure the message. The power controller automatically restarts using the existing configuration if the download was aborted or rejected. The configuration data transmissions preferably include checksums to improve data integrity. If the data and checksums add up wrong, the power controller rejects the data as being corrupted.

As long as the configuration data is not detected as being corrupted, the power controller will use as much of the download configuration data as possible to update the current configuration. Too much data for the board combination is not considered to be corrupted data. For example, it is possible to download configuration data for a ten-board power controller board daisy-chain to a two-board power controller board daisy-chain, or to download configuration data for a two-board power controller board daisy-chain to a ten-board power controller board daisy-chain. The power controller configuration does not revert to defaults if no configuration data is received, the current configuration remains in effect if no configuration data is received.

Once the power controller has successfully received an entire configuration data file, a message is displayed, "Configuration data successfully received for N power controller boards . . . This power controller board daisy-chain contains M power controller boards . . . WARNING—Only Partial Configuration Data Received . . . Press Y)es to use this data or N)o to discard this data".

The WARNING message is only displayed if the number of power controller boards that the configuration file refers to does not match the number of power controller boards actually in the power controller board daisy-chain. The user then responds with a "Y" to cause the power controller to restart using the data or with an "N" to cause the power controller to restart using the previous configuration. The "Y" and "N" responses can be entered in either upper or lower case. If the users does not respond to the message within the standard five minute power controller prompt time out, the power controller will restart using the previous configuration data.

The power controller will display, "Restarting using configuration" or "Restarting using existing configuration". The SCFG command requires administrative username privileges to execute.

The configuration data that is sent to or from the power controller is sent in seven-bit ASCII format. There are two general data configuration blocks that are contained in the power controller configuration data. One of the general configuration blocks is used for comments while the other contains the actual power controller configuration data. During normal data stream parsing of a power controller configuration data stream, the processing code is sensitive to four possible events.

If sixty seconds elapse between characters in a power controller configuration data stream, the parsing assumes a problem exists with the configuration data and the process is aborted with appropriate messages. None of the data in a power controller configuration data stream is used. Such time out detection is active during all power controller configuration data stream parsing.

If a CTRL-C character is detected in the power controller configuration data stream, the parsing assumes the process is being aborted by user intervention and the process is aborted with appropriate messages. None of the data in a power controller configuration data stream is used. Such abort character detection and processing is active during all power controller configuration data stream parsing.

A comment data configuration block indicator (e.g., the "#") is received, if a "#" character is detected in the power controller configuration data stream, processing switches to the comment block data stream processing. Comment character parsing is only active during normal data stream parsing when neither a comment nor a configuration data block is being parsed.

A configuration data block indicator (e.g., the "$") is received, if a "$" character is detected in the power controller configuration data stream. Processing switches to the configuration block data stream processing. Configuration data block character parsing is only active during normal data stream parsing when neither a comment nor a configuration data block is being parsed.

A power controller configuration comment block is recognized by a "#" character. When the configuration data stream is being parsed in the normal data stream parsing mode, a "#" indicates the beginning of a general comment block. When a "#" character is detected, normal data stream processing switches to comment block data stream processing. During comment block data stream processing, all data in the configuration data stream after the "#" character is treated as comment data until a carriage return or line feed character is received. The sixty-second time out and the CTRL C parsing and actions continue in effect.

The carriage return character (0x0D) signifies the end of a comment block and causes the parsing of a power controller configuration data stream to return to the normal data stream processing as described earlier.

The line feed character (0x0A) signifies the end of a comment block and causes the parsing of a power controller configuration data stream to return to the normal data stream processing.

There are no checksums associated with comment blocks and no additional checks for data integrity are performed on comment blocks. Once a carriage return or line feed is detected in the comment block data, normal data stream processing continues. It is possible for garbage characters to exist in the configuration data stream between comment blocks and configuration data blocks. Garbage characters that occur between valid configuration blocks are ignored (unless the character is a CTRL C which aborts the process).

A power controller configuration data record block is recognized by a "$" character. When the configuration data stream is being parsed in the normal data stream parsing mode, a "$" indicates the beginning of a configuration data record block. When a "$" character is detected, normal data stream processing switches to data record block data stream processing. During data record block data stream processing, the data that follows the "$" character is expected to be in the following format:

| |
|---|
| bytes 1 and two |
| bytes 3 and 4 |
| byte 5 and 6 |
| bytes 7 ... 516 |
| last two bytes |
| count field |
| board ID field |
| record type field |
| record data field |
| checksum field |

The first two characters after the "$" represent the high nibble and the low nibble of a one-byte hexadecimal value in the range of 00 through FF, e.g., 0-255 decimal. Because the two characters in the count field represent a single hexadecimal byte, the characters are limited to the ASCII-0-9 digits and the upper case ASCII characters A through F. The value of the hexadecimal byte represented by the two characters in the count field is the actual number of hexadecimal bytes that are represented by the characters in the record data field. The count is not the actual number of characters that are transmitted in the record data field data stream since the representation of a single hexadecimal byte requires two characters (one character for each nibble). The maximum size of a power controller configuration data record block is five hundred eighteen characters. Two characters for count, plus two characters for board-ID plus two characters for record type, plus up to five hundred ten characters for record data, and two characters for checksum.

The two characters after the count field represent a one-byte hexadecimal value in the range of 00-1A (e.g., 0-26 decimal) that is the power controller board ID that the record data is associated with. The "00" value is a special value that is used to indicate the associated data record applies to all power controller boards in a daisy-chain. Other values are used to identify a specific power controller board in a daisy-chain to which the associated record data applies. The characters in this field are limited to the ASCII-0-9 digits and upper case ASCII "A" character.

The two characters after the board ID field represent a one-byte hexadecimal value in the range of 00 through 04 that is the record type identifier for this data record block. Currently five record types are defined as follows:

| | |
|---|---|
| 00 | configuration data general trailer record (MUST be last record) |
| 01 | configuration data general header/version record (MUST be first record) |
| 02 | user-name table entry record |
| 03 | serial port name table entry record |
| 04 | power controller board page configuration table record |

Although only five record types are defined at this time, the structure allows expansion up to two hundred fifty-six different record types. Record type 01 must be the first record in the power controller configuration data stream and record type 00 must be the last record in the power controller configuration data stream.

In the record data field, the record type field is from zero to five hundred ten characters that represent up to two hundred fifty-five hexadecimal bytes of configuration data. Each character in the record data field represents a nibble of a single hexadecimal byte. As a result the number of characters in the record data field must be an even number of characters. The characters are limited to the ASCII-0-9 digits and the ASCII A-F characters (upper case only).

Following the record data field is a two-character field that represents a single hexadecimal byte, which is the record checksum value. The checksum value is the value that when added to the sum of the values of all of the hexadecimal bytes that are represented by the characters in the data stream will result in a value of zero. The checksum applies to actual hexadecimal values represented by the characters in the data stream, not to characters in the data stream. All of the fields in the configuration data record block (e.g., count field, board ID field, record type field, and record data field) are included in the sum to which the checksum value is applied.

The configuration data general header/version record is the identified by an ASCII-01 in the record type field. Such record provides information on the entire contents of the configuration data stream. Such record must be the first configuration data record block in a configuration data stream. Configuration data comment blocks may precede the current record in the configuration data stream, but the first configuration data record block must be a header/version record.

The count field of the current record is set to ASCII-04 to reflect the number of bytes of actual data that are contained in the record data field. The board ID field of the current record is set to ASCII-01 to indicate that the current record is directed towards the first board in the daisy-chain. The record data field of the general header/version record is formatted as follows:

| |
|---|
| bytes 1 and two |
| bytes 3 and 4 |
| bytes 5 and 6 |
| bytes 7 and 8 |
| version |
| number of username table entry records |
| number of serial port table entry records |
| number of power controller board page configuration table records |

The first two characters in the record data field are an ASCII representation of the current version of this configuration data. The initial version value is set to ASCII-01. Following the version characters is a two-character ASCII representation of the number of username table entry records that are contained in this configuration data stream. The range of values is 00 through seventy-eight (e.g., 0 through one hundred twenty-eight decimal). A value of 00 indicates that there are no username table entry records in the configuration data stream. Following the number of username table entry records is a two-character ASCII representation of the number of serial port table entry records that are contained in this configuration data stream. The range of values is 00 through twenty (e.g., 0 through thirty-two decimal). A value of 00 indicates that there are no serial port table entry records in the configuration data stream. Following the number of serial port table entry records is a two-character ASCII representation of the number of power controller page configuration table records that are contained in this configuration data stream. The range of values is 00 through 1A (e.g., 0 through twenty-six decimal). A value of 00 indicates that there are no power controller configuration table records in the configuration data stream. All configuration data record blocks use the last two characters to represent the checksum value.

The username table entry record is the identified by an ASCII-02 in the record type field. Such record is used to send an entry in the power controller user-name table. These records can appear in any order in the configuration data stream except as the first or last configuration data record block in a configuration data stream. The count field of the current record is set to ASCII twenty-eight (e.g., forty decimal) to reflect the number of bytes of actual data that are contained in the record data field. The board ID field of the current record is set to ASCII-01 to indicate that the current record is directed towards the first board in the daisy-chain. The record data field of the username table entry record contains ASCII characters that represent the high and low nibbles of the actual hexadecimal bytes that make an entry in the power controller username table. The actual number of ASCII characters in the record data field is eighty (e.g., two characters for each hexadecimal byte). As with all configuration data record blocks, the last two characters contain the checksum value.

The serial port table entry record is identified by an ASCII-03 in the record type field. Such record is used to send an entry in the power controller serial port table. These records can appear in any order in the configuration data stream except as the first or last configuration data record block in a configuration data stream. The count field of the current record is set to ASCII twenty-eight (e.g., forty decimal) to reflect the number of bytes of actual data that are contained in the record data field. The board ID field of the current record is set to ASCII-01 to indicate that the current record is directed towards the first board in the daisy-chain. The record data field of the serial port table entry record contains ASCII characters that represent the high and low nibbles of the actual hexadecimal bytes that make an entry in the power controller serial port table. The actual number of ASCII characters in the record data field is eighty, e.g., two characters for each hexadecimal byte. As with all configuration data record blocks, the last two characters contain the checksum value.

The power controller board page configuration table entry is the identified by an ASCII-04 in the record type field. Such record is used to send an entire 256-byte power controller board configuration data area. The single byte count field in the configuration data record block limits the actual amount of data that can be represented in a record to two hundred fifty-five bytes. As a result, the first byte of the power controller board configuration data area is not included in the data. Such byte is used internally by the power controller code for virtual power controller purposes and is not required nor desired to be included in the configuration data. These records can appear in any order in the configuration data stream except as the first or last configuration data record block in a configuration data stream.

The count field of the current record is set to ASCII FF to reflect the number of bytes of actual data that are contained in the record data field. The board ID field of the current record is set to reflect the ASCII representation of the unit ID of the power controller board to which the record applies. The record data field contains ASCII characters that represent the high and low nibbles of the actual hexadecimal bytes of the power controller board configuration data area. The actual number of ASCII characters in the record data field is five hundred ten, e.g., two characters for each of the two hundred fifty-five hexadecimal bytes. As with all configuration data record blocks, the last two characters contain the checksum value.

The configuration data general trailer record is the identified by an ASCII-00 in the record type field. Such record is used to signal the end of the configuration data stream. Such record must be the last configuration data record block in a configuration data stream. Configuration data comment blocks may precede or follow the current record in the configuration data stream, but no additional configuration data record blocks may follow the current record. The count field of the current record is set to ASCII-00 to indicate there is no data in the record data field for the current record. The board ID field of the current record is set to ASCII-01 to indicate that the current record is directed towards the first board in the daisy-chain. As with all configuration data record blocks, the last two characters contain the checksum value.

An SCFG command initiates a configuration upload/download. The first board in a power controller board daisy-chain assumes control of all upload/download operations. A command line processor on the first board preferably evaluates the operation and signals the other boards in the daisy-chain. A SAVE operation uploads the power controller configuration from the power controller to the user system. A RESTORE operation downloads configuration data from a user system to the power controller.

When a user enters the SCFG command using a SAVE parameter, a power controller command processor code preferably prompts the user to prepare to received the configuration data as described in SCFG command description earlier in this document.

Once the user responds to the power controller prompt with an indication that the SAVE operation is to proceed. This may include a sixty second delay. The power controller code formats and sends a power controller internal command to the power controller board daisy-chain to inform them that a configuration send is in progress. The first-in-daisy-chain board then formats and sends the configuration data general header/version record to the user. Then a record is sent for all active username table and serial port table entries. Then a record is formatted and sent for each of the 256-byte configuration blocks for each virtual sentry, if there are more than one. Once all of the configuration data is sent by the first-in-daisy-chain board, the first-in-daisy-chain board raises DTR to the daisy-chain. Such causes each board to send its own 256-byte configuration block, one for each virtual sentry. As each board completes its configuration data send, it propagates DTR down the daisy-chain which causes all of the boards to send their configuration data. The first-in-daisy-chain board monitors the data traffic flowing from the downstream boards. When no data is transmitted for one or two seconds, the first-in-daisy-chain board assumes all data has been transmitted. At this point the first-in-daisy-chain board formats and sends the general trailer record and the upload is complete.

For configuration download (RESTORE), a user enters the SCFG command using a RESTORE parameter. The command processor on the first board in the daisy-chain sends an internal power controller command to all of the boards in the power controller board daisy-chain that informs them that a configuration data stream is to be received. Such is similar to a SET CODE UPLOAD command that puts all of the boards into a receive data mode, and causes a current configuration to be saved to flash ROM. However this command does not return to the system monitor. The power controller code that processes this command prepares to receive the configuration data and sends a positive response to the first board in the daisy-chain to indicate the configuration upload state is active. The first board in the daisy-chain waits for a response from all boards in the daisy-chain and then displays the download message to prompt the user to begin the configuration data send. A timer is set to allow the user five minutes to begin the configuration download. If the download fails for time out, invalid data detected, etc., an error message is displayed for twenty seconds. Then a power controller restart is initiated. The error message that is displayed in the event of an error is only displayed after a ten second time period has elapsed since the last character was received from the user. Such delay is incorporated to prevent the error message from colliding with an incoming data stream and therefore being lost.

The parsing that occurs during the data transfer is described in the power controller configuration data format section of this document. Individual power controller boards process data that is directed to them as necessary. If errors are detected, the individual power controller boards record the error and wait for the end of command condition to report the error.

Once the configuration data general trailer record is received, all boards verify their received data. Such verification includes verifying version number agreement between the configuration data and the existing data as well as checksum verification. The first-in-daisy-chain board propagates DTR down the daisy-chain and waits for a response from each board. Boards in the daisy-chain send a "+" to indicate the configuration was received and is verified. The boards send a "−" to indicate the received data was not verified. The boards send a "?" to indicate no configuration data was received for this board. If any boards report invalid data, the entire operation in aborted and the power controller is reset using the previous configuration data.

The first-in-daisy-chain board evaluates the responses from the other boards in the daisy-chain and sends a message to the user indicating the result of the command and prompting the user to commit the configuration. If the number of boards in the power controller board daisy-chain does not correspond to the number of configuration data records received or if some of the boards responded with a "?", a warning message is displayed in addition to the normal prompt messages to the user. Such warning message is to alert the user to discrepancy between the configuration data and the actual power controller board daisy-chain being configured.

Based on the users response to the prompt, the first-in-daisy-chain board sends a power controller internal command to the daisy-chain to signal the boards to save or ignore the configuration. The first board then displays the success message and after a twenty second delay, initiates a power controller restart. At this point the power controller will restart with either the configuration or with the existing configuration depending on the users response.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A reconfigurable network-equipment power- management system, comprising:
   a power-distribution apparatus having a power input disposed in the power-distribution apparatus and a communication interface disposed in the power-distribution apparatus for communicating with a remote user system;
   a plurality of power-control outlets disposed in the power-distribution apparatus, the plurality of power-control outlets connectable in power supply communication with the power input and one or more separate electronic appliances;
   a plurality of power-control relays disposed in the power-distribution apparatus, each of the plurality of power-control relays in power control communication with at least one among the plurality of power-control outlets, whereby the plurality of power-control outlets and the plurality of power-control relays provide operating power to the one or more separate electronic appliances and are able to interrupt the operating power to the one or more separate electronic appliances;
   a power-control outlet user configuration accessible by the remote user system for affecting the power provided or interrupted to the plurality of power-control outlets, wherein the power-control outlet user configuration comprises user configuration data for at least one of e the plurality of power-control outlets disposed in the power-distribution apparatus;
   a memory disposed in the power-distribution apparatus and having a power-control outlet user configuration storage area; and
   at least one power controller disposed in the power-distribution apparatus, wherein the at least one power controller corresponds to at least two of the plurality of power-control outlets, the at least one power controller comprising a power-control outlet user configuration transfer mechanism in communication with the communication interface accessible by the remote user system, whereby the power-control outlet user configuration transfer mechanism imports and exports the power-control outlet user configuration data between the power-distribution apparatus and the remote user system via the communication interface as a plurality of data packets that are assembled to form the power-control outlet user configuration; and
   a network software conversion agent in communication with a remote power manager at the remote user system, whereby the network software conversion agent converts software commands communicated as TCP/IP packets into signals that can be understood by the remote power manager.

2. The system of claim 1, further comprising:
a configuration upload command mechanism in communication with the power-control outlet user configuration transfer mechanism, whereby the configuration upload command mechanism recognizes a user command to upload the power-control outlet user configuration from the memory disposed in the power-distribution apparatus to a destination.

3. The system of claim 1, further comprising:
a configuration substitution command mechanism in communication with the power-control outlet user configuration transfer mechanism, whereby the configuration substitution command mechanism recognizes a user command to download a substitute power-control outlet user configuration to the memory disposed in the power-distribution apparatus from a source.

4. The system of claim 1, further comprising:
an integrity-checking application that checks the integrity of substitute power-control outlet user configuration data downloaded to the memory disposed in the power-distribution apparatus and facilitates rejection of a corrupted data transfer.

5. The system of claim 1, further comprising:
an integrity-checking application that checks the integrity of substitute power-control outlet user configuration data downloaded to the memory disposed in the power-distribution apparatus and facilitates adoption of an acceptable data transfer.

6. The system of claim 1, further comprising:
a configuration editor application that allows for construction of a substitute power-control outlet user configuration.

7. The system of claim 1, further comprising:
a configuration editor application that allows for modification of the power-control outlet user configuration into a substitute power-control outlet user configuration.

8. The system of claim 1, further comprising:
a command mechanism in communication with the power-control outlet user configuration transfer mechanism, whereby the command mechanism recognizes a first user command to upload the power-control outlet user configuration from the memory disposed in the power-distribution apparatus to a destination and recognizes a second user command to download a substitute power-control outlet user configuration to the memory disposed in the power-distribution apparatus from a source;
a transfer mechanism, whereby the transfer mechanism checks the integrity of the substitute power-control outlet user configuration downloaded to the memory disposed in the power-distribution apparatus and rejects a corrupted-file transfer, and whereby the transfer mechanism also checks the integrity of the substitute power-control outlet user configuration data downloaded to the memory disposed in the power-distribution apparatus and adopts for use an acceptable data transfer; and
an editor application, whereby the editor application allows for modification of the power-control outlet user configuration into a substitute user configuration.

* * * * *

UNITED STATES PATENT AND TRADEMARK OFFICE
CERTIFICATE OF CORRECTION

| | |
|---|---|
| PATENT NO. | : 7,774,443 B2 |
| APPLICATION NO. | : 09/892350 |
| DATED | : August 10, 2010 |
| INVENTOR(S) | : Carrel W. Ewing et al. |

It is certified that error appears in the above-identified patent and that said Letters Patent is hereby corrected as shown below:

On the Bibliographic page, (56) References Cited, U.S. Patent Documents, the following should be added:

| | | |
|---|---|---|
| --4,101,878 | 9/1999 | Shimizu, et al.-- |
| --4,495,568 | 1/1985 | Gilbert, et al.-- |
| --4,709,318 | 11/1987 | Gephart, et al.-- |
| --4,780,714 | 10/1988 | Moustakas, et al.-- |
| --4,937,561 | 6/1990 | Sasaki, et al.-- |
| --5,374,922 | 12/1994 | Ebersohl-- |
| --5,412,645 | 5/1995 | Younkin, et al.-- |
| --5,481,730 | 1/1996 | Brown, et al.-- |
| --5,485,576 | 1/1996 | Fee, et al.-- |
| --5,495,607 | 2/1996 | Pisello, et al.-- |
| --5,561,769 | 10/1996 | Kumar, et al.-- |
| --5,585,678 | 12/1996 | Dijk, et al.-- |
| --5,761,084 | 6/1998 | Edwards-- |
| --5,781,434 | 7/1998 | Tobita, et al.-- |
| --5,717,934 | 2/1998 | Pitt, et al.-- |
| --5,652,893 | 7/1997 | Ben-Meir, et al.-- |
| --4,051,326 | 9/1977 | Badagnani, et al.-- |
| --4,206,444 | 6/1980 | Ferlan-- |
| --4,356,545 | 10/1982 | West-- |
| --4,442,319 | 04/1984 | Treidl-- |
| --4,611,289 | 09/1986 | Coppola-- |
| --4,647,721 | 03/1987 | Busam, et al.-- |
| --4,701,946 | 10/1987 | Oliva, et al.-- |
| --5,198,806 | 03/1993 | Lord-- |
| --5,319,571 | 06/1994 | Langer, et al.-- |
| --5,410,713 | 04/1995 | White, et al.-- |

Signed and Sealed this
Twenty-fifth Day of January, 2011

David J. Kappos
*Director of the United States Patent and Trademark Office*

CERTIFICATE OF CORRECTION (continued)
U.S. Pat. No. 7,774,443 B2

CONT'D:

On the Bibliographic page, (56) References Cited, U.S. Patent Documents, the following should be added:

--5,596,628    01/1997    Klein--
--5,506,573    04/1996    Ewing, et al.--

On the Bibliographic page, (56) References Cited, Other Publications, the following should be added:

--Sentry R-2000 Remote Power Manager © 2001.--
--Sentry 110/230 VAC Product Family © 2000.--
--Sentry Power Manager - 48 VDC Product Family © 2000.--
--Distributed Power Module Product List, Sep. 23, 2002.--
--Sentry Power Modules © 1999.--
--Sentry Power Tower Products © 2001/2002.--
--Sentry Expanded Function Power Tower (PTEF) © 2001/2002.--
--Sentry Serial Power Tower (PTSS) © 2001/2002.--
--Sentry Power Tower Power Distribution © 2001/2002.--
--Sentry Commander R-400 Remote Power Mgr. © 2001/2002.--
--Sentry Commander R-400 Remote Pwr. Mgr. Datasheet © 1999.--
--Sentry Administrator R-450 © 2001/2002.--
--Sentry Adminstrator R-450 Remote Pwr. Mgr. © 1998.--
--Remote Power On/Off, Installation and Operations Manual, © 1991.--
--Sentry Remote Power Manager brochure © 1991.--
--Power-On product wrapper © 1991.--
--Remote Power On/Off product wrapper © 1991.--
--Intelligent Power Module © 1991.--
--Local and Remote Power On/Off Alternatives © 1991.--
--NEW BOX Specification, dated March 6, 1991.--
--RPM-15 Power Module Specification, March 18, 1991.--
--Sentry Remote Power Manager, Operational Instructios, Sep. 24, 1992.--
--"Keeping Up With. . .", INTERNET TELEPHONY, Mar. 2000, pp. 84-87.--
--"Rebooting Across the Net", PC Magazine, May 5, 1998.--
--"Server Technology Sentry R-2000", PC Magazine, May 5, 1998.--
--"APC MasterSwitch", PC Magazine, May 5, 1998.--
--AMERICAN POWER CONVERSION, "Call-UPS", March 1993, #996-0070, APC, West Kingson, RI 02892 USA.--
--AMERICAN POWER CONVERSION, "Measure-UPS", MARCH 1993, #996-0127, APC, West Kingston, RI 02892 USA.--
--AMERICAN POWER CONVERSION, "Introducing the UPS to Build Your Business On...", October 1993, #996-0207-A, APC, West Kingston, RI 02892 USA.--
--AMERICAN POWER CONVERSION, "Application Note #A2", October 1993, APC, West Kingston, RI 02892 USA.--

CERTIFICATE OF CORRECTION (continued)  
U.S. Pat. No. 7,774,443 B2

CONT'D

On the Bibliographic page, (56) References Cited, Other Publications, the following should be added:

--AMERICAN POWER CONVERSION, "Application Note #A6", October 1993, APC, West Kingston, RI 02892 USA.--
--AMERICAN POWER CONVERSION, "Internetworking Power Protection", January 1994, #996-0295, APC, West Kingston, RI 02892 USA.--
--AMERICAN POWER CONVERSION, "PowerNet SNMP Adapter", January 1994, #996-0126, APC, West Kingston, RI 02892 USA.--
--AMERICAN POWER CONVERSION, "Solutions '94", February 1994, #996-0131, APC, West Kingston, RI 02892 USA.--
--AMERICAN POWER CONVERSION, "APC NetShelter", 1995, #996-0643-A, APC, West Kingston, RI 02892 USA.--
--AMERICAN POWER CONVERSION, "PowerNet", September 1995, #996-0325-b, APC, West Kingston, RI 02892 USA.--
--AMERICAN POWER CONVERSION, "APC Smart-UPS RM", 1996, #996-0618-B, APC, West Kingston, RI 02892 USA.--
--AMERICAN POWER CONVERSION, "APC Smart-UPS XL", 1996, #996-0630-B, APC, West Kingston, RI 02892 USA.--
--AMERICAN POWER CONVERSION, "Smart-UPS", 1996, #996-0386-E, APC, West Kingston, RI 02892 USA.--
--AMERICAN POWER CONVERSION, "PowerChute plus", 1996, #996-0041-C, APC, West Kingston, RI 02892 USA.--
--AMERICAN POWER CONVERSION, "Internetworking Power Protection", 1996, #996-0295-B, APC, West Kingston, RI 02892 USA.--
--AMERICAN POWER CONVERSION, "UPS Accessories", 1996, #996-0411-C, APC, West Kingston, RI 02892 USA.--
--AMERICAN POWER CONVERSION, "Application Notes", October 1996, #996-0495-C, APC, West Kingston, RI 02892 USA.--
--AMERICAN POWER CONVERSION, "PowerNet", 1998, #996-0325D, APC, West Kingston, RI 02892 USA.--
--B. Ewing and J. Mallory, "Power-ON/OFF-Product Information", 1990, Server Technology, Inc., Reno, Nevada.--
--Raphael Needleman, "Power-ON/OFF Lets you Turn on Remote PCs by Phone", February 1991, Info World Impressions, V. 13, Issue 5.--
--Server Technology, Inc., "Any-To-Any Matrix Communications Switch', 1996, Server Technology, Inc. Reno, Nevada.--
--Server Technology, Inc., "Sentry Ambassador", 1996, Server Technology, Inc. Reno, Nevada.--
--Server Technology, Inc., "LAN WAN, Enerprise, Internet Access Equipment", 1996, Server Technology, Inc., Reno, Nevada.--
--Server Technology, Inc., "SENTRYRACK", 1996, Server Technology, Inc., Reno, Nevada.--
--Server Technology, Inc., "SENTRYINTERNATIONAL", 1996, Server Technology, Inc., Reno, Nevada.--

CERTIFICATE OF CORRECTION (continued)
U.S. Pat. No. 7,774,443 B2

CONT'D:

On the Bibliographic page, (56) References Cited, Other Publications, the following should be added:

--Server Technology, Inc., "SENTRY Communications and User Interface", 1996, Server Technology, Inc., Reno, Nevada.--
--Server Technology. Inc., "SENTRYSHELF", 1996, Server Technology, Inc., Reno, Nevada.--
--Server Technology, Inc., "SENTRY Power Modules", 1996, Server Technology, Inc., Reno, Nevada.--
--Server Technology, Inc., "SENTRY ShutDown Remote Power Manager", 1997, Server Technology, Inc., Reno, Nevada.--
--Server Technology, Inc., "SENTRY Administrator R-450 Remote Power Manager, 1999, Server Technology, Inc., Reno, Nevada.--
--Server Technology, Inc., "How Do You ReBoot Remote Equipment?", 1999, Server Technology, Inc., Reno, Nevada.--
--Server Technology, Inc., "SENTRY R-2000 Remote Power Manager", 1999, Server Technology, Inc., Reno, Nevada.--
--Server Technology, Inc., "MasterSwitch", 1996, Server Technology, Inc., Reno, Nevada.--
--Sentry Ambassador Remote Power Manager © 1996.--
--W. Richard Stevens. "TCP/IP Illustrated, vol. 1 - The Protocols", pp. 359-361, 1994.--
--Michael Slater. "Microprocessor-Based Design - A Comprehensive Guide to Hardware Design", pp. 19-24, 1989.--
--Peter Drake, "Using SNMP to Manage Networks", pp. 2/1-2/4, 1991.--
--Novak, T., "Remote Management of Individual Power Supplies", netman.cit.buffalo.edu/CDN-M, p. 1, May 10, 1995.--
--Uninteruptable Power Source FAQ, v. 1.0, pp. 1-10, February 10, 1994.--
--Davison, M., et al., UPS Management Information Base, Internet Draft, IETF, pp. 1-28, May 13, 1992.--

In the DETAILED DESCRIPTION OF THE PREFERRED EMBODIMENTS, Column 6, Line 3, "daisy-daisy-chain" should read --daisy-chain--.

Column 15, Line 25, "in aborted" should read --is aborted--.

In the CLAIMS, Column 16, Line 12, "of e the" should read --of the--.

Column 18, Line 7, "corrupted file transfer" should read --corrupted transfer--.